United States Patent [19]

Nakada

[11] 3,903,695

[45] Sept. 9, 1975

[54] EXHAUST GAS PURIFICATION SYSTEM

[75] Inventor: Masahiko Nakada, Toyota, Japan

[73] Assignee: Toyota Jidosha Kogyo Kabushiki Kaisha, Tokyo, Japan

[22] Filed: Oct. 9, 1973

[21] Appl. No.: 404,145

[30] Foreign Application Priority Data

Feb. 7, 1973   Japan................................ 48-14594

[52] U.S. Cl. ................................................ 60/290
[51] Int. Cl.² ...................... F02B 75/10; F01N 3/00
[58] Field of Search...................... 60/290, 274, 289

[56] References Cited
UNITED STATES PATENTS

| 3,433,242 | 3/1969 | Voorheis | 60/290 |
|---|---|---|---|
| 3,641,767 | 2/1972 | Kraus | 60/274 |
| 3,738,109 | 6/1973 | Tatsutomi | 60/290 |
| 3,751,916 | 8/1973 | Hayashida | 60/289 |
| 3,805,522 | 4/1974 | Sheppard | 60/290 |
| 3,812,673 | 5/1974 | Muroki | 60/290 |

*Primary Examiner*—Douglas Hart
*Attorney, Agent, or Firm*—Toren, McGeady and Stanger

[57] ABSTRACT

An air injection type exhaust gas purification system is provided with an after-burning prevention air supply pipe adapted to supply a portion of the secondary air delivered from an air pump driven directly by the engine into the fuel intake means of the engine. A control valve is located midway in the after-burning prevention air supply pipe and is arranged to be opened only when a sudden increase in the negative pressure in the fuel intake means of the engine occurs. In order to insure that the air for preventing after-burning is provided to the fuel intake means only during a desired phase of engine operation, means are provided for inhibiting the opening of the control valve when the discharge pressure of the air pump is below a predetermined level.

4 Claims, 1 Drawing Figure

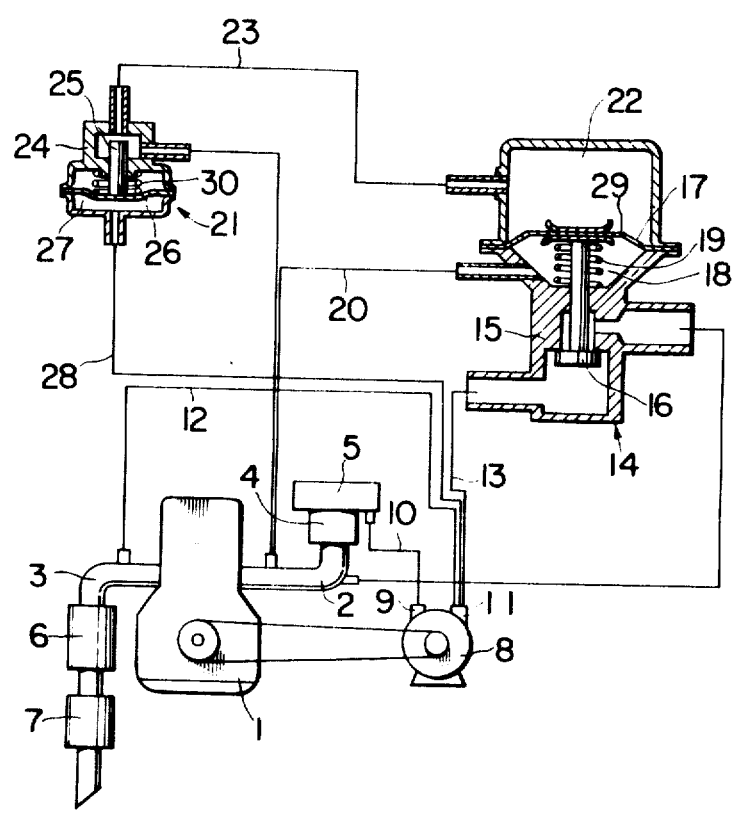

EXHAUST GAS PURIFICATION SYSTEM

BACKGROUND OF THE INVENTION

1. Field of the Invention

The present invention relates to an exhaust gas purification system for an internal combustion engine wherein secondary air is injected into the exhaust pipe of the system to promote burning of the noxious unburned components of the engine exhaust gases. More particularly, the invention relates to a system wherein a portion of the secondary air derived from an air pump driven by the engine is applied to the fuel intake means of the engine in order to prevent undesired afterburning.

2. Description of the Prior Art

Generally, exhaust gas purification systems of the type referred to herein are provided with an air pump which is belt-driven by the engine, with the air discharged from the air pump being injected into the exhaust gas discharge pipe in order to complete combustion of harmful unburned components contained in the exhaust gas, thereby to promote cleansing of the gas exhausted from the engine. However, in such a system, when the throttle valve of the engine is suddenly closed during operation of the engine, liquid fuel flowing on the interior surface of the fuel intake pipe will be suddenly vaporized, thereby temporarily inducing an over-rich fuel mixture which is supplied to the engine and which causes imperfect combustion. This results in the discharge of an increased amount of unburned components into the exhaust system of the engine and when these components are mixed with the secondary air which is supplied from the air pump, they cause explosive combustion, or so-called "after-burning". Such explosive combustion tends to cause damage to the engine exhaust system, and also creates unpleasant noise with regard to the driver of the vehicle.

One measure which is considered effective to prevent occurrence of such after-burning is to supply secondary air into the engine intake means when a sudden increase in the negative pressure in such intake pipe, thereby diluting the over-rich mixture which is delivered to the engine. However, in such an arrangement, if sudden increases in the negative pressure occur within the fuel intake means, the richness of the mixture will be diluted even during phases of engine operation when a relatively rich mixture is required, such as at the time of engine starting or when speed reduction from a low speed range occurs. Thus, such a means may interfere with the starting of the engine or injure smooth engine operation.

It is a primary object of the present invention to overcome the above-discussed disadvantages of prior art devices.

SUMMARY OF THE INVENTION

Briefly, the present invention may be described as an air-injection exhaust gas purification system for an internal combustion engine which includes fuel intake means, exhaust gas discharge means, and an air pump driven by the engine for supplying secondary air to the exhaust gas discharge means. The invention comprises, in combination, after-burning prevention air supply means including a first pipe for supplying a portion of the air from the air pump into the engine intake means, a control valve located midway in said first pipe and including first valve means adapted to be opened and closed to control air flow in said first pipe, first means applying the pressure in said intake means to control said first valve means to open only upon occurrence of a sudden rise in negative pressure in the fuel intake means, a regulator valve including second valve means adapted to be opened and closed in response to the discharge pressure of the air pump and second means applying the pressure in the engine intake means through said second valve means to prevent opening of the first valve means when the discharge pressure of the air pump is below a predetermined level, said regulator valve being arranged to close said second valve means when the discharge pressure of the air pump is above said predetermined level, thereby to prevent application of the fuel intake means pressure to the first valve means by the second pressure applying means.

The various features of novelty which characterize the invention are pointed out with particularity in the claims annexed to and forming a part of this disclosure. For a better understanding of the invention, its operating advantages and specific objects attained by its used, reference should be had to the accompanying drawings and descriptive matter in which there is illustrated and described a preferred embodiment of the invention.

DESCRIPTION OF THE DRAWING

The drawing is a schematic representation of an air injection type exhaust gas purification system embodying the present invention.

DETAILED DESCRIPTION OF THE PREFERRED EMBODIMENT

Referring now to the drawing, an internal combustion engine 1 includes fuel intake means comprising a suction pipe 2, exhaust gas discharge means comprising an exhaust pipe 3, a carburetor 4, an air cleaner 5, an exhaust gas purification device 6, such as, for example, a manifold reactor or a catalytic converter, and a muffler 7. An air pump 8 driven directly by the engine 1 includes an intake port 9 connected to the air cleaner 5 through a suction pipe 10 and a discharge port 11 connected to the exhaust pipe 3 through a first discharge pipe 12 and to the suction pipe 2 through a second discharge pipe 13. The first discharge pipe 12 conducts air, for enhancing burning of unburned components in the exhaust gas, to the exhaust pipe 3, while the second discharge pipe 13 conducts air for diluting the intake fuel mixture to the suction pipe 2 for the purpose of preventing after-burning.

A control valve 14 is provided midway in the afterburning prevention air discharge pipe 13 with the valve 14 being designed to be opened only upon occurrence of a sudden increase in the negative pressure in the suction pipe 2. Control valve 14 comprises a valve casing 15, a valve body 16, a diaphragm 17 mounted in the valve body 16, a diaphragm chamber 18, a spring 19 adapted to bias the valve body 16 in the diaphragm chamber 18 toward the closed position, and a negative pressure conduit 20 which connects the diaphragm chamber 18 with the suction pipe 2. When a sudden rise in negative pressure occurs in the suction pipe 2, the control valve 14 is actuated through the negative pressure conduit 20 and diaphragm 17 to open the valve body 16 to supply a portion of the air from the air pump 8 into the suction pipe 2 through the after-burning prevention air supply pipe 13, thereby to dilute the fuel mixture in the suction pipe 2.

A regulator valve 21 operates to inhibit opening of the control valve 14 when the discharge pressure of the air pump 8 is below a predetermined level, for example, when the engine 1 is rotating at a relatively low speed. The regulator valve 21, arranged in accordance with the principles of the present invention, includes a pressure conduit 23 connecting the suction pipe 2 and a diaphragm chamber 22 which is arranged to have pressure therein act in opposition to the pressure in the diaphragm chamber 18 in the control valve 14. Change-over valve means 24 provided midway in the pressure conduit 23 includes a valve body 25, a diaphragm 26 mounted in the valve body 25, a diaphragm chamber 27 for the diaphragm 26 and a discharge pressure conduit 28 connecting the diaphragm chamber 27 with the discharge side of the air pump 8.

In the operation of the regulator valve 21, when the discharge pressure of the air pump is below a predetermined level, the valve body 25 is opened in order to apply the negative pressure in the intake means 2 to the diaphragm chamber 22 in the control valve 14, thereby rendering the pressure in the diaphragm chamber 18 equal to the pressure in the opposing diaphragm chamber 22 in a manner to inhibit movement of the diaphragm 17. When the disclosure pressure of the air pump 8 is relatively high, and above said predetermined level, the valve body 25 of the change-over valve 24 will be closed, thereby allowing operation of the control valve 14 to occur without influence from the regulator valve 21.

A small aperture 29 is provided in the diaphragm 17 of the control valve 14 with the size of said aperture being suitably selected according to the operating time of the valve body 16, and a spring 30 is provided in an arrangement biasing the valve body 25 toward its opened position.

Thus, in accordance with the present invention, when a relatively low engine speed is detected by the discharge pressure of the air pump 8, opening of the control valve 14 provided midway in the after-burning prevention air supply pipe 13 in inhibited in response to such discharge pressure of the air pump 8 so that the richness of the mixture in the suction pipe 2 will not be diluted in a situation where a richer mixture is required, as might occur, for example, at the time of starting or idling of the engine. Accordingly, there is eliminated the possibility of detrimental effect to engine performance, such as impairment of the starting of the engine or interference with smooth engine operation. Furthermore, when the engine speed is at relatively high level, the control valve 14 operates in a positive manner to open the air passage in the after-burning prevention air supply pipe 13 upon a sudden rise in the negative pressure of the suction pipe 2, thereby to prevent undesired after-burning.

While a specific embodiment of the invention has been shown and described in detail to illustrate the application of the inventive principles, it will be understood that the invention may be embodied otherwise without departing from such principles.

What is claimed is:

1. In an air injection exhaust gas purification system for an internal combustion engine including fuel intake means, exhaust gas discharge means, and an air pump driven by said engine for supplying secondary air to said exhaust gas discharge means, the combination comprising after-burning prevention air supply means including a first pipe for supplying a portion of the air from said air pump to said intake means, a control valve intermediately located in said first pipe including first valve means adapted to be opened and closed to control air flow in said first pipe, first means applying the pressure in said intake means to control said first valve means to open only upon occurrence of a sudden rise in negative pressure in said fuel intake means, a regulator valve including second valve means adapted to be opened and closed in response to the discharge pressure of said air pump, second means for applying said negative pressure in said intake means through said second valve means to said first valve means to prevent opening of said first valve means when the discharge pressure of said air pump is below a predetermined level, and means for applying the discharge pressure of said air pump to said regulator valve as a control signal indicative of engine operating speed, said regulator valve being arranged to close said second valve means when the discharge pressure of said air pump is above said predetermined level thereby to prevent application of said fuel intake means pressure to said first valve means by said second pressure applying means when said engine is operating above a predetermined operating level commensurate with said predetermined level of said air pump discharge pressure.

2. A system according to claim 1, wherein said first valve means includes a pressure actuated diaphragm separating said control valve into a first valve chamber and a second valve chamber, a valve body adapted to open and close air flow through said first pipe in response to movement of said diaphragm, spring means biasing said valve body toward the closed position, said first intake means pressure applying means being arranged to apply the pressure in said intake means to said second valve chamber thereby to effect opening of said valve body.

3. A system according to claim 2, wherein said second valve means include a diaphragm movably mounted within said regulator valve, a valve body adapted to open and close said regulator valve in response to movement of said diaphragm, a diaphragm chamber defined within said regulator valve to move said diaphragm in the direction of closing of said valve body when the pressure in said diaphragm chamber is above a predetermined level, and means for applying the output pressure of said air pump to said regulator valve diaphragm chamber.

4. A system according to claim 3, wherein said second intake means pressure applying means include conduit means connecting said intake means with said first diaphragm chamber of said control valve, said valve body of said regulator valve being arranged to open and close said conduit means.

* * * * *